(12) United States Patent
Fujiki (10) Patent No.: US 12,338,111 B2
(45) Date of Patent: Jun. 24, 2025

(54) STACKER CRANE (71) Applicant: MURATA MACHINERY, LTD., Kyoto (JP)

(72) Inventor: Junichi Fujiki, Inuyama (JP)

(73) Assignee: MURATA MANUFACTURING, LTD., Kyoto (JP)

( * ) Notice: Subject to any disclaimer, the term of this patent is extended or adjusted under 35 U.S.C. 154(b) by 261 days.

(21) Appl. No.: 18/009,998

(22) PCT Filed: Feb. 10, 2021

(86) PCT No.: PCT/JP2021/004889
§ 371 (c)(1),
(2) Date: Dec. 13, 2022

(87) PCT Pub. No.: WO2022/030035
PCT Pub. Date: Feb. 10, 2022

(65) Prior Publication Data
US 2023/0227297 A1   Jul. 20, 2023

(30) Foreign Application Priority Data
Aug. 3, 2020   (JP) .................................. 2020-131899

(51) Int. Cl.
*B66F 9/07*   (2006.01)
*B65G 1/04*   (2006.01)

(52) U.S. Cl.
CPC .............. *B66F 9/07* (2013.01); *B65G 1/0407* (2013.01); *B65G 2207/22* (2013.01)

(58) Field of Classification Search
CPC ...... B65G 1/0407; B65G 2207/22; B66F 9/07
See application file for complete search history.

(56) References Cited

FOREIGN PATENT DOCUMENTS

| | | | |
|---|---|---|---|
| JP | 62-136921 U | 8/1987 | |
| JP | 9-226909 A | 9/1997 | |
| JP | 3128629 B2 | 1/2001 | |
| JP | 2006-122286 A | 5/2006 | |
| JP | 5458856 B2 | 4/2014 | |
| JP | 5595332 B2 | 9/2014 | |
| KR | 102114816 B1 | 5/2020 | |
| KR | 20220157233 A | * 11/2022 | ........... B65G 1/0407 |

OTHER PUBLICATIONS

Official Communication issued in International Patent Application No. PCT/JP2021/004889, issued on Feb. 7, 2023.
English translation of Official Communication issued in International Patent Application No. PCT/JP2021/004889, mailed on Apr. 20, 2021.
Official Communication issued in International Patent Application No. PCT/JP2021/004889, mailed on Apr. 20, 2021.

* cited by examiner

*Primary Examiner* — Kaitlin S Joerger
(74) *Attorney, Agent, or Firm* — Keating & Bennett, LLP (57) ABSTRACT

A stacker crane, which retrieves cases from shelves and conveys the same, includes a traveling cart, a mast, a lift platform, a slide fork, and a cover. The cover is made of a flame retardant or non-inflammable material, and is supported in a detachable manner so as to move toward the top surface of the slide fork.

13 Claims, 11 Drawing Sheets

STACKER CRANE

BACKGROUND OF THE INVENTION

1. Field of the Invention

The present invention relates to a stacker crane, and in particular, to a stacker crane with a fire prevention function.

2. Description of the Related Art

A conventional automatic warehouse includes a plurality of racks. The racks are arranged in parallel, and each rack includes a plurality of shelves arranged in the extending direction and in the up and down direction.

The automatic warehouse includes a stacker crane that is a conveying device for unloading a package to a shelf of a rack or loading a package from a shelf of a rack. The stacker crane includes a traveling device for traveling along a rail, a transfer device, and a lifting device that moves the transfer device in the up and down direction. A portion of the rail is disposed beside the rack in parallel, and the stacker crane places the transfer device besides the rack at vicinity of a target shelf, so as to transfer the package in this state.

Conventionally, stacker cranes installed in secondary battery manufacturing processes are equipped with various fire prevention functions as measures for fire protection in a battery cell of a secondary battery.

For instance, a stacker crane is equipped with a fire extinguishing device or a fire spread prevention device. The fire extinguishing device performs initial fire extinguishing of a secondary battery housed in a rack, for example. The fire spread prevention device is constituted of a shutter, which covers a secondary battery placed on the lift platform so as to prevent shattering or fire spread of the battery cell during conveyance of the package. Finally, the stacker crane conveys the package covered by the shutter to a water submersion tank, and puts the package into the water submersion tank.

Note that there is a known technique for extinguishing fire by closing the opening of the storage space of the article that started the fire, and conveying the article after the fire is extinguished to a water submersion tank (see Japanese Patent No. 5,458,856).

In the conventional technique described above, the shutter has a complicated structure and increases the number of components, and hence the space and cost of the structure are increased.

In addition, if the fire grows inside the shutter, sensors or the like may be badly affected or an operation malfunction of the shutter may occur. If the shutter cannot be opened, the package cannot be put into the water submersion tank.

SUMMARY OF THE INVENTION

Preferred embodiments of the present invention provide stacker cranes in each of which a fire prevention mechanism is simplified and the number of drive components is reduced, so as to improve reliability.

Hereinafter, a plurality of preferred embodiments are described. These preferred embodiments can be arbitrarily combined as necessary or desired.

A stacker crane according to one aspect of a preferred embodiment of the present invention, which retrieves articles from a plurality of shelves and conveys the same, includes a traveling device, a mast, a lift platform, a transfer device, and a cover.

The mast is provided to the traveling device.

The lift platform is movable up and down along the mast.

The transfer device is operable to transfer the article onto the lift platform.

The cover is made of a flame retardant or non-inflammable material, and is supported in a detachable manner so as to be movable toward an article placement surface of the lift platform.

In this stacker crane, if a fire is generated at an article on a shelf, the transfer device of the stacker crane places the article on the article placement surface of the lift platform after initial fire extinguishing, for example. Next, the cover is detached and moved to cover the article. After that, for example, the stacker crane conveys the article to a water submersion tank and puts the article with the cover into the water submersion tank.

Note that the order of detaching the cover and starting to convey the article may be opposite.

Note that the conveying destination of the article with the cover after covering the article by the cover may be other fire extinguishing equipment.

As the cover is provided as described above, when conveying the article after initial fire extinguishing to the water submersion tank, for example, fire shattering or fire spreading can be prevented. In addition, sensors or the like of the lift platform can be protected by the cover.

In particular, because the cover is made of a flame retardant or non-inflammable material, even if a fire generates again at the article on the lift platform, fire spread can be prevented.

In particular, it is sufficient that the cover can be detached, and hence its structure becomes simple, and reliability is improved by reducing the number of drive components.

In particular, as the cover is detached from a holder, for example, when putting the article into a water submersion tank for example, the cover can be put together with the article into it. In other words, when putting the article into the water submersion tank, it is not necessary to perform an operation such as returning the cover to its original position.

The cover is larger than the article and may have a size sufficient to cover the article. The cover has a box shape similar to the contour of the article, for example.

In this stacker crane, the cover can cover the article and hence can securely prevent fire spreading or fire shattering.

The article may be a container including an opening on its upper side. The cover may have a shape to close at least the opening of the container. Note that to "close" means to cover a portion or an entirety of the opening from above.

In this stacker crane, as the cover covers the opening on the top surface of the article, the size of the cover can be reduced or minimized.

The stacker crane may further include a lock to hold the cover in a normal time and detach the cover, a sensor to detect that the article is placed on the article placement surface after a fire has started at the article, and a controller configured or programmed to allow the cover to be detached in accordance with detection information from the sensor.

In this stacker crane, the operation of detaching the cover is performed simply by releasing the holding of the lock.

The cover may be moved to the article placement surface by its own weight.

In this stacker crane, the number of drive components to drive the cover can be reduced, and hence reliability can be improved.

The stacker crane may further include an elastic pusher to push the cover toward the article placement surface.

In this stacker crane, the elastic member pushes the cover so as to move it quickly and securely.

The stacker crane may further include a guide to support the cover in a movable manner in the up and down direction.

In this stacker crane, because the guide is provided, the cover is prevented from unnecessarily swinging in a normal time, while it can fall to a target position on the article placement surface when it is detached.

The stacker crane may further include a foam fire extinguisher on an inner surface of the cover to foam at a predetermined temperature.

In this stacker crane, if a high temperature state is maintained or resumed after the cover covers the article, the foam fire extinguisher foams to fill inside the cover, so as to extinguish the fire.

Note that the foam fire extinguisher is, for example, a chemical foaming agent, a physical foaming agent, or foamable microcapsules.

In the stacker cranes according to preferred embodiments of the present invention, fire prevention mechanisms are simplified, and the number of drive components is reduced, and hence reliability is improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. First Preferred Embodiment

Figure 1:
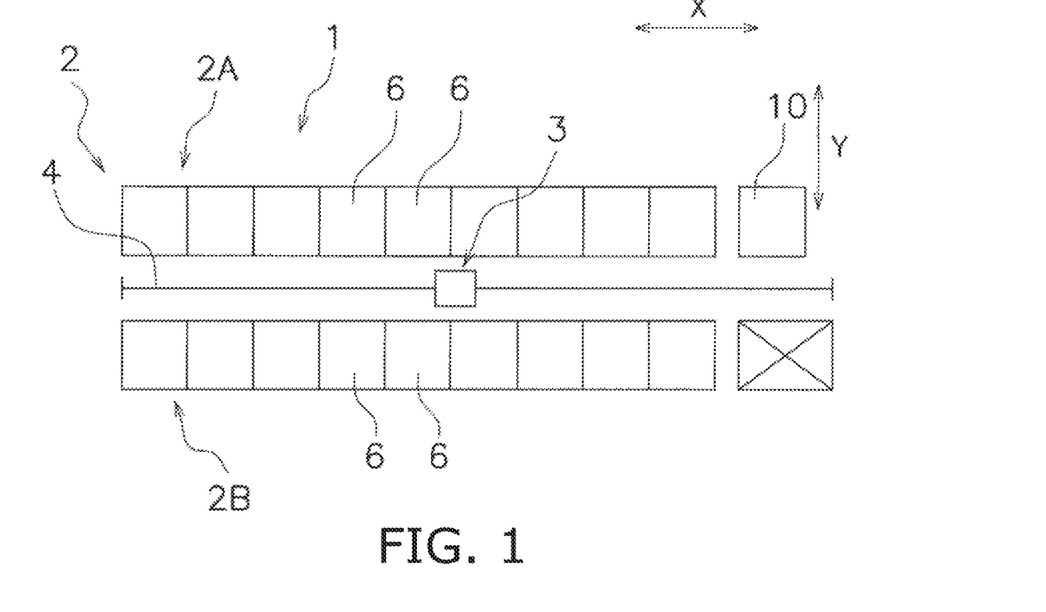
FIG. 1 is a schematic plan view of an automatic warehouse adopting a first preferred embodiment of the present invention.
Figure 2:
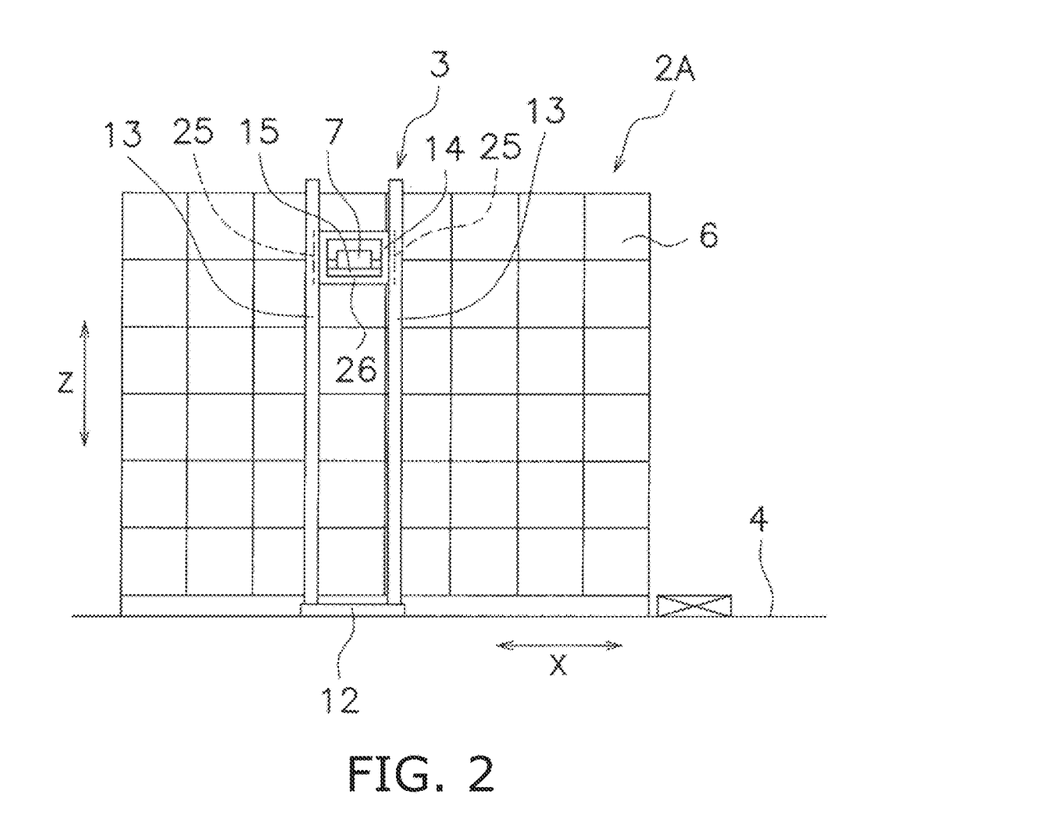
FIG. 2 is a schematic side view of the automatic warehouse.

With reference to FIGS. 1 and 2, an automatic warehouse 1 as a first preferred embodiment of the present invention is described. FIG. 1 is a schematic plan view of an automatic warehouse adopting the first preferred embodiment. FIG. 2 is a schematic side view of the automatic warehouse.

Note that in the following description, an "X direction" is a driving direction of a stacker crane 3, a "Y direction" is an article transferring direction of a transfer device, and a "Z direction" is a lifting direction of the transfer device. The X direction, the Y direction, and the Z direction are orthogonal to each other.

The automatic warehouse 1 includes racks 2 and the stacker crane 3.

The racks 2 include a first rack 2A and a second rack 2B. The first rack 2A and the second rack 2B are disposed side by side in the Y direction so as to sandwich a rail 4 disposed on a stacker crane path extending in the X direction in FIG. 1. The first rack 2A and the second rack 2B include a plurality of shelves 6 arranged in the X direction and in the Z direction.

Figure 3:
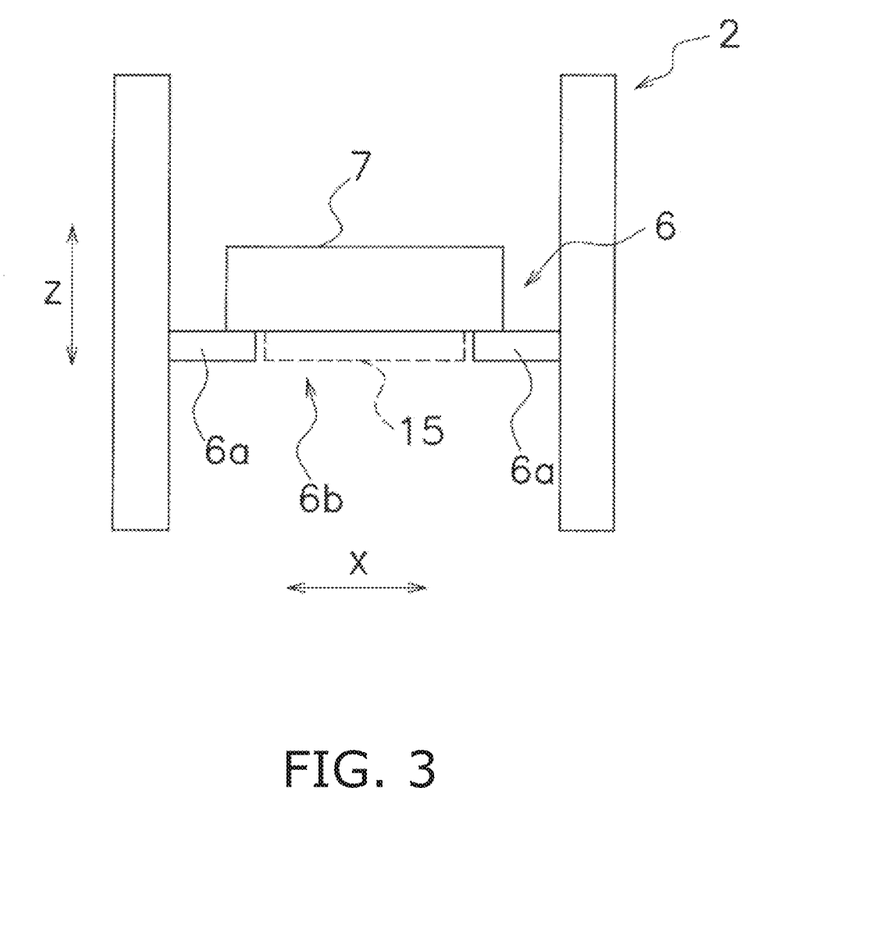
FIG. 3 is a front view of a shelf and a case.

With reference to FIG. 3, the shelf 6 is described. FIG. 3 is a front view of the shelf and a case. The shelf 6 includes a pair of left and right package support members 6a. As clear from the diagram, a case 7 (described later) can be placed on each shelf 6. Between the pair of left and right package support member 6a, a fork passing gap 6b is structured so as to allow a slide fork 15 described later to move in the up and down direction.

Figure 4:
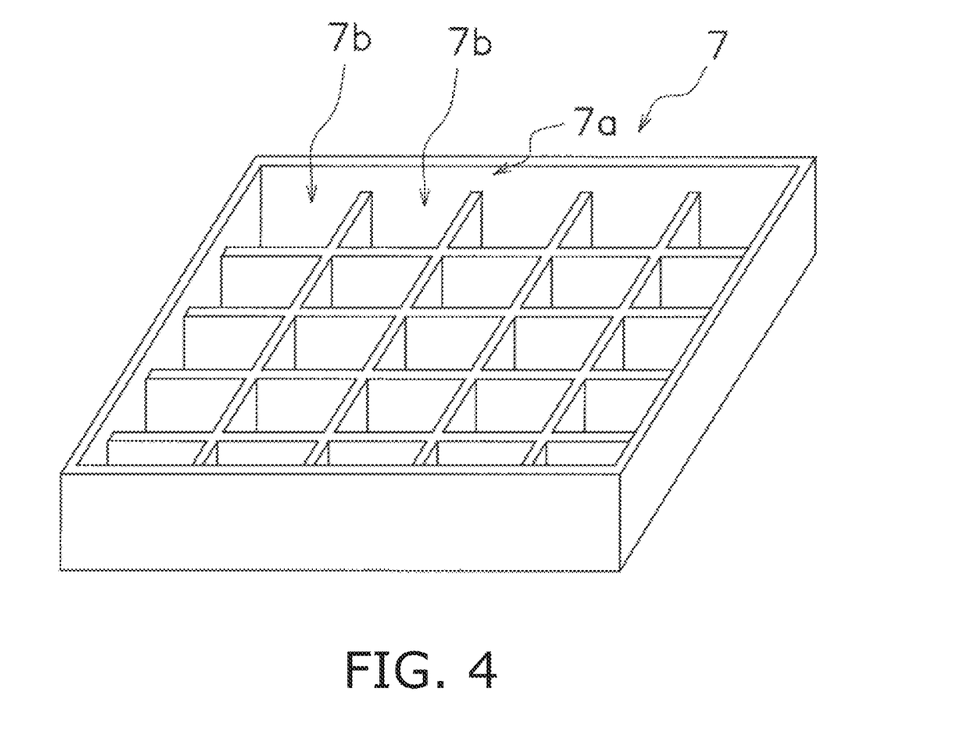
FIG. 4 is a perspective view of the case.
Figure 5:
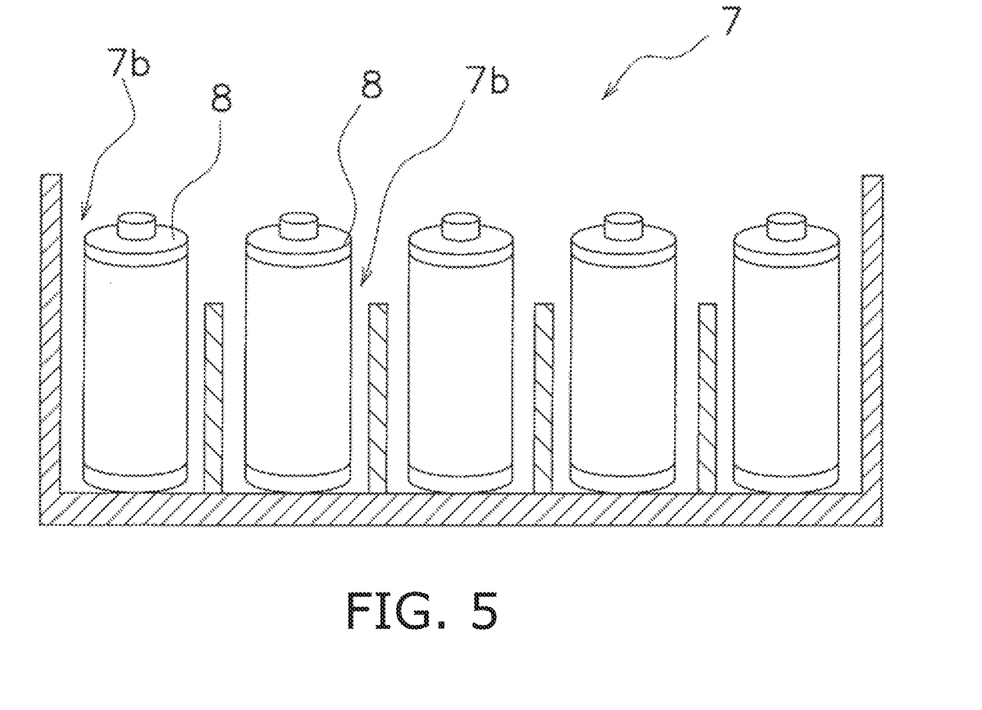
FIG. 5 is a cross-sectional view of the case and secondary batteries.

With reference to FIGS. 4 and 5, the case 7 is described. FIG. 4 is a perspective view of the case. FIG. 5 is a cross-sectional view of the case and secondary batteries.

The case 7 is a container including an opening 7a on the upper side. Specifically, the case 7 includes a plurality of spaces defined by partitions, and each space houses a secondary battery 8. Note that in the following description, when referring to as the "case 7" simply, it includes the state where the secondary batteries 8 are housed.

A predetermined number of fire detectors 9 (FIG. 9) are provided to the rack at a predetermined interval; one for each shelf 6 or a plurality of shelves 6. The fire detectors 9 are connected to a system controller 53 (described later). Note that the fire detector 9 is a known technique, and a type thereof is not particularly limited.

As illustrated in FIG. 1, the automatic warehouse 1 includes a water submersion tank 10. The water submersion tank 10 is a tank in which to submerge the case 7 that started a fire. The water submersion tank 10 is at one side of the rack 2 in the X direction.

The water submersion tank 10 is equipped with a lifter (not shown). When the case 7 is transferred to the lifter, the lifter goes down so as to submerge the case 7 into water.

With reference to FIG. 2, the stacker crane 3 is described.

The stacker crane 3 is guided in a movable manner in the X direction along the rail 4. The stacker crane 3 includes a traveling cart 12, a pair of masts 13 on both sides in the X direction at the upper portion of the traveling cart 12, a lift platform 14 mounted to the masts 13 in a movable manner in the up and down direction, and the slide fork 15 mounted to the lift platform 14 so as to transfer the case 7.

The traveling cart 12 is equipped with wheels (not shown) traveling on the top surface of the rail 4. The traveling cart 12 further includes a travel motor (not shown) to rotate the wheels (not shown) and a speed reducer (not shown).

The lift platform 14 includes a pair of guide members 25 guided by the masts 13, and a support table 26 extending between the guide members 25.

The stacker crane 3 includes a lift mechanism 27 (FIG. 9) that moves the lift platform 14 up and down. The lift mechanism 27 includes a belt (not shown) to drive the lift platform 14, a lift pulley (not shown), and a lift motor (not shown) to drive the lift pulley.

The support table 26 of the lift platform 14 is provided with the slide fork 15. The slide fork 15 can extend horizontally on both sides in the Y direction. The slide fork 15 is connected to a transfer motor (not shown) via the speed reducer and the belt.

Figure 6:
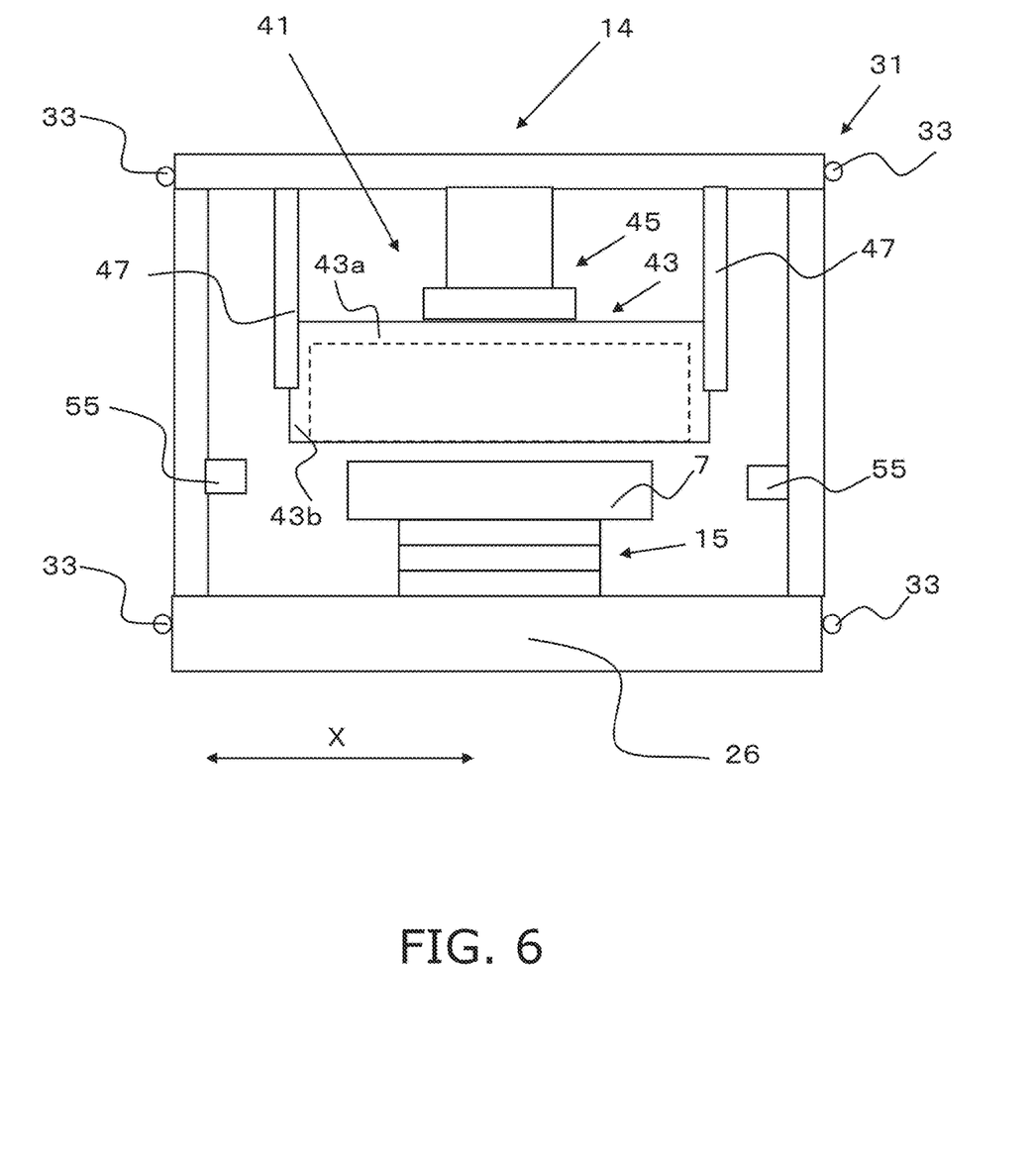
FIG. 6 is a schematic front view of a lift platform (before detaching a cover).

The slide fork 15 can transfer the case 7 on the lift platform 14 to the shelf 6 or transfer the case 7 on the shelf 6 to the lift platform 14. As illustrated in FIG. 6, the case 7 is placed on the top surface (an example of the article placement surface) of the slide fork 15 when it is on the lift platform 14.

Figure 9:
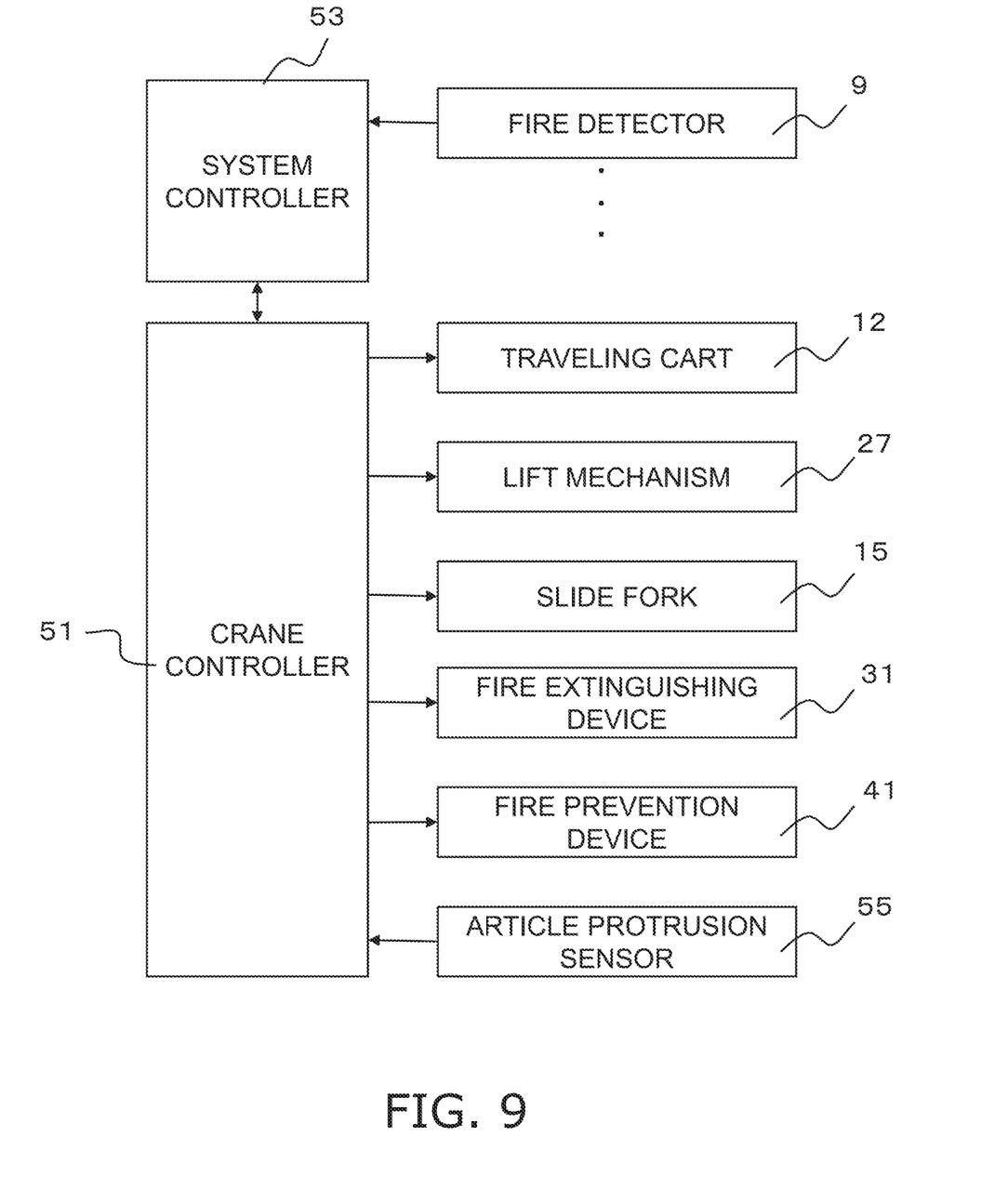
FIG. 9 is a block diagram illustrating a control structure of a stacker crane.

As illustrated in FIGS. 6 and 9, the stacker crane 3 includes a fire extinguishing device 31. The fire extinguishing device 31 is a device for initial fire extinguishing of fire inside the rack 2. The fire extinguishing device 31 is provided to the lift platform 14.

The fire extinguishing device 31 includes, for example, a carbon dioxide gas cylinder (not shown) filled with carbon dioxide gas as a fire extinguishant, a fire extinguishing hose (not shown), and a fire extinguishing nozzle 33. Further, when the case 7 placed on the shelf 6 generates smoke or fire, the fire detector 9 detects the fire, and the fire extinguishing device 31 performs a fire extinguishing process based on the detection information.

The stacker crane is equipped with a fire prevention device 41.

Figure 7:
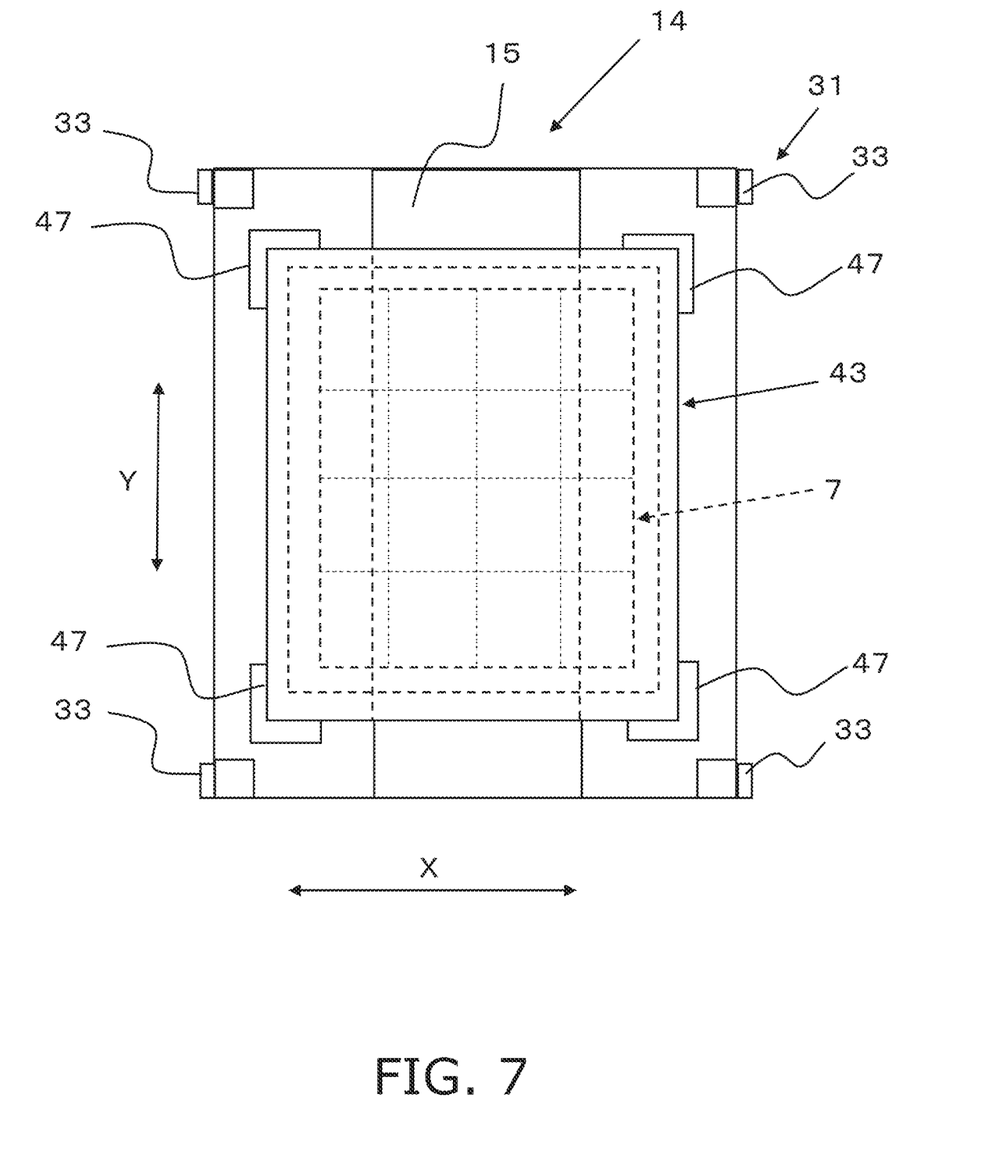
FIG. 7 is a schematic plan view of the lift platform.
Figure 8:
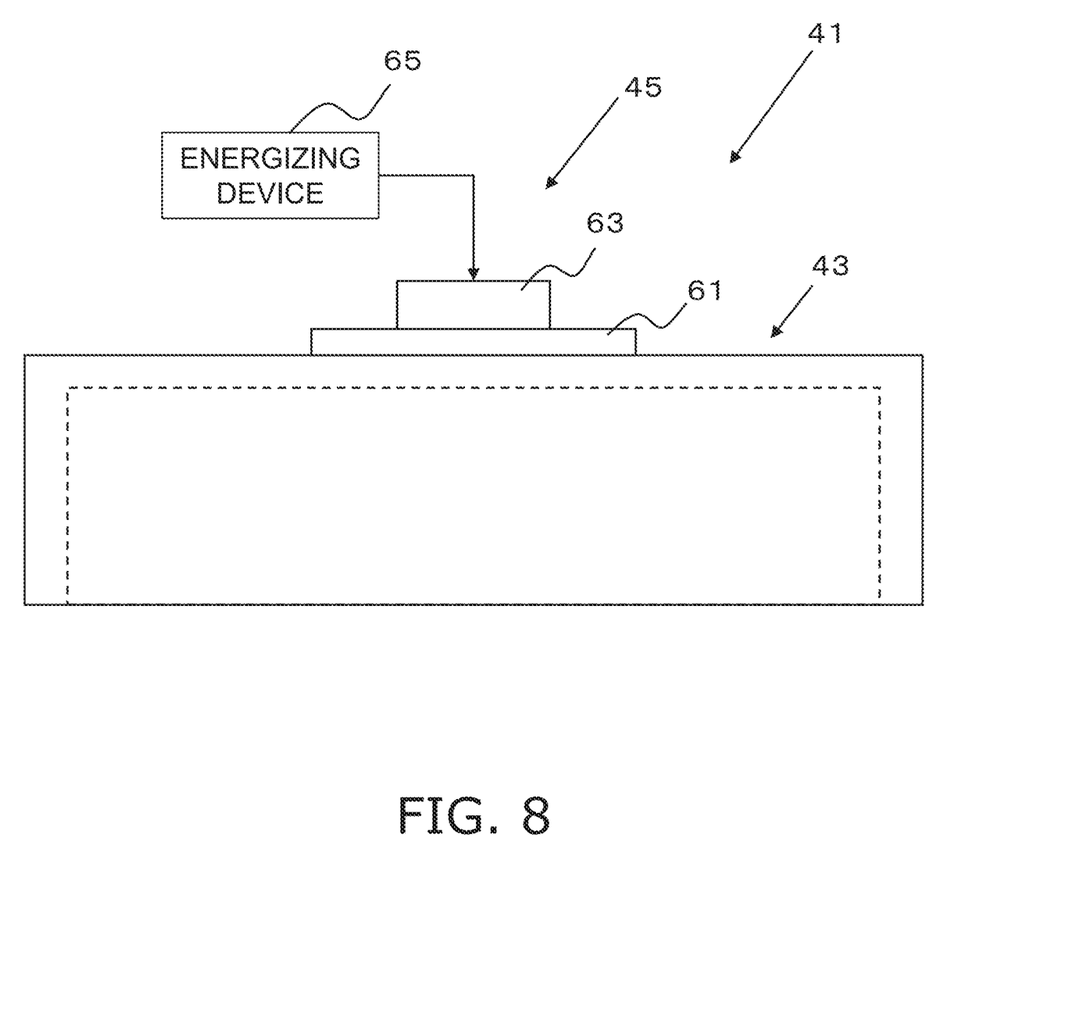
FIG. 8 is a schematic front view of a fire prevention device.

With reference to FIGS. 6 to 8, the fire prevention device 41 is described. FIG. 6 is a schematic front view of the lift platform (before detaching the cover). FIG. 7 is a schematic plan view of the lift platform. FIG. 8 is a schematic front view of a lock device.

The fire prevention device 41 is a device that prevents the case 7 after the initial fire extinguishing from starting fire again in the lift platform 14. The fire prevention device 41 is provided to the lift platform 14.

The fire prevention device 41 includes a cover 43, and a lock device 45 that holds the cover 43 in a detachable manner. The cover 43 is disposed above the slide fork 15 in the lift platform 14. When the cover 43 is detached, it moves down toward the slide fork 15.

Specifically, the cover 43 is larger than the case 7 and has a size that can cover the case 7. More specifically, the cover 43 has a shape similar to the contour of the case 7, i.e., a box shape including a top surface 43a and a side surface 43b, and a rectangular shape in a plan view.

In addition, the cover 43 is made of a flame retardant or non-inflammable material. For instance, the cover 43 may be made of any one of steel sheet, non-inflammable board, and non-inflammable sheet, or may be a structure made of other material on which non-inflammable board or non-inflammable sheet is glued.

The lock device 45 holds the cover 43 in a normal time, and after the case 7 is transferred onto the lift platform 14, it releases the holding so as to detach the cover 43.

The cover 43 is movable toward the slide fork 15 by its own weight. In other words, the operation of covering the case 7 by the cover 43 is performed only by releasing the holding of the lock device 45.

With reference to FIG. 8, a detailed structure of the lock device 45 is described. FIG. 8 is a schematic front view of the fire prevention device.

As illustrated in FIG. 8, the lock device 45 includes a magnetic member 61 attached to the top surface of the cover 43, an electromagnet 63 disposed above the magnetic member 61, and an energizing device 65. While the energizing device 65 is turned on to supply power to the electromagnet 63, the electromagnet 63 fixedly holds the magnetic member 61 by its magnetic force. Therefore, as illustrated in FIG. 6, the cover 43 is held at a position separated above from the slide fork 15 and the case 7.

Figure 11:
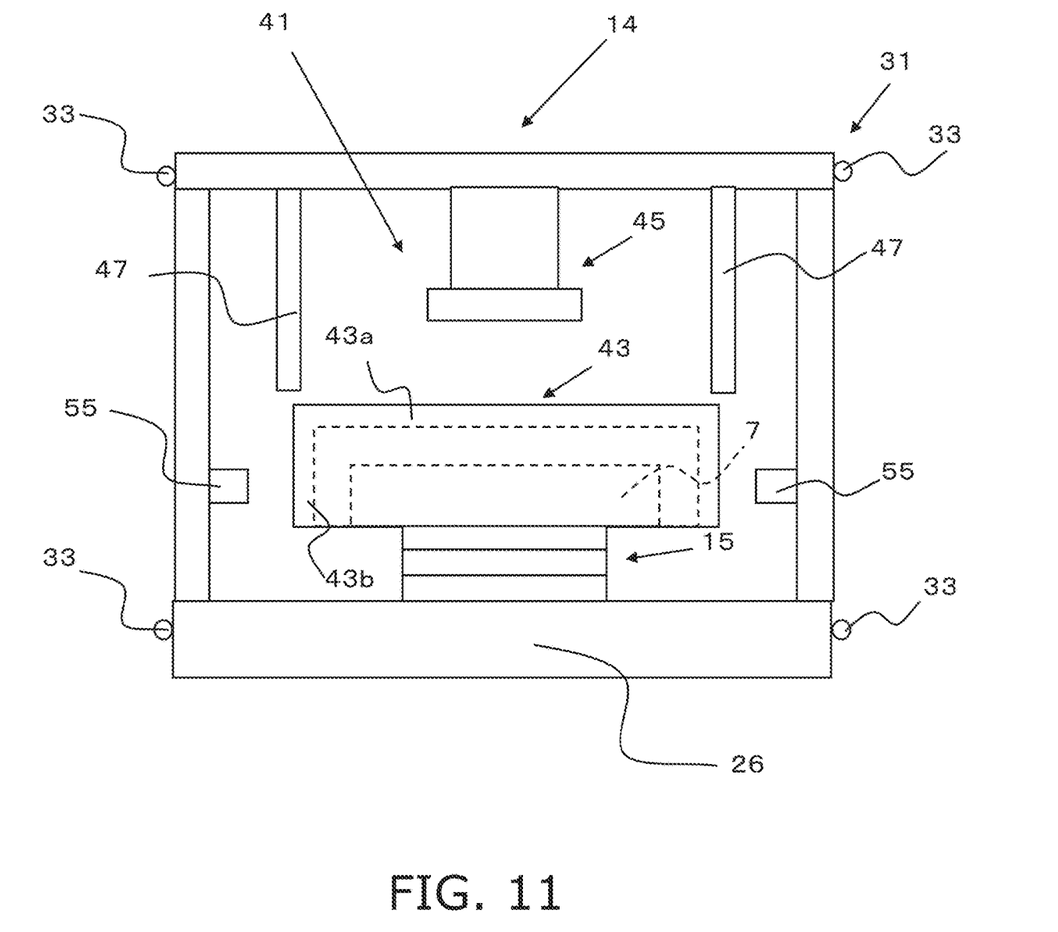
FIG. 11 is a schematic front view of the lift platform (after detaching the cover).

When the power supply to the electromagnet 63 is turned off, the magnetic force of the electromagnet 63 vanishes, and the magnetic member 61 is detached from the electromagnet 63. In this way, the cover 43 falls. After falling continuously in the vertical direction, the cover 43 finally abuts the slide fork 15 as illustrated in FIG. 11. In other words, it comes to the state where the lower surface of the side surface 43b of the cover 43 is placed on the slide fork 15. In this state, the inner surface of the top surface 43a of the cover 43 may contact with the top surface of the case 7 or may be spaced apart from the same. Note that FIG. 11 is a schematic front view of the lift platform (after detaching the cover).

In this stacker crane 3, the number of drive components to drive the cover 43 can be reduced, and hence reliability is improved.

The fire prevention device 41 further includes a guide 47 that supports the cover 43 in a movable manner in the up and down direction. Because the guide 47 is provided, the cover 43 is prevented from unnecessarily swinging in the normal time, while it can fall to a target position when it is detached.

Specifically, the guide 47 includes members extending from up to down so as to support four corners of the cover 43 along the vertical direction. The guide 47 supports the upper portion of the cover 43 in normal time as illustrated in FIG. 6. Therefore, the cover 43 is prevented from swinging in normal time. When the cover falls as illustrated in FIG. 11, the guide 47 is separated from the upper portion of the cover 43. Therefore, when the case 7 and the cover 43 are moved, the guide 47 does not interfere with them.

With reference to FIG. 9, the control structure of the stacker crane 3 is described. FIG. 9 is a block diagram illustrating the control structure of the stacker crane.

The stacker crane 3 includes a crane controller 51. The crane controller 51 can communicate with the system controller 53 that controls the entire of the automatic warehouse 1.

The crane controller 51 is a computer system including a processor (such as a CPU), a storage device (such as a ROM, a RAM, an HDD, and an SSD), and various interfaces (such as an A/D converter, a D/A converter, and a communication interface). The crane controller 51 executes a program stored in a storage (corresponding to a portion of or an entirety of a storage area of the storage device), so as to perform various control operations.

The crane controller 51 may include a single processor or may include a plurality of processors independent of each other for individual controls.

A portion or all of the functions of the individual elements of the crane controller 51 may be realized as a program that can be executed by the computer system of the control unit. Other than that, a portion of the functions of individual elements of the control unit may be defined by a custom IC.

The crane controller 51 is connected to the traveling cart 12, the lift mechanism 27, and the slide fork 15, and the crane controller 51 is configured or programmed to control these devices.

The crane controller 51 is connected to the fire extinguishing device 31 and the fire prevention device 41, and the crane controller 51 is configured or programmed to control these devices.

The crane controller 51 is further connected to various sensors such as an article presence detection sensor (not shown) and an article protrusion sensor 55.

Although not illustrated, the crane controller 51 is connected to sensors to detect a size, a shape, and a position of the case 7, sensors and switches to detect states of individual devices, and an information input device.

Figure 10:
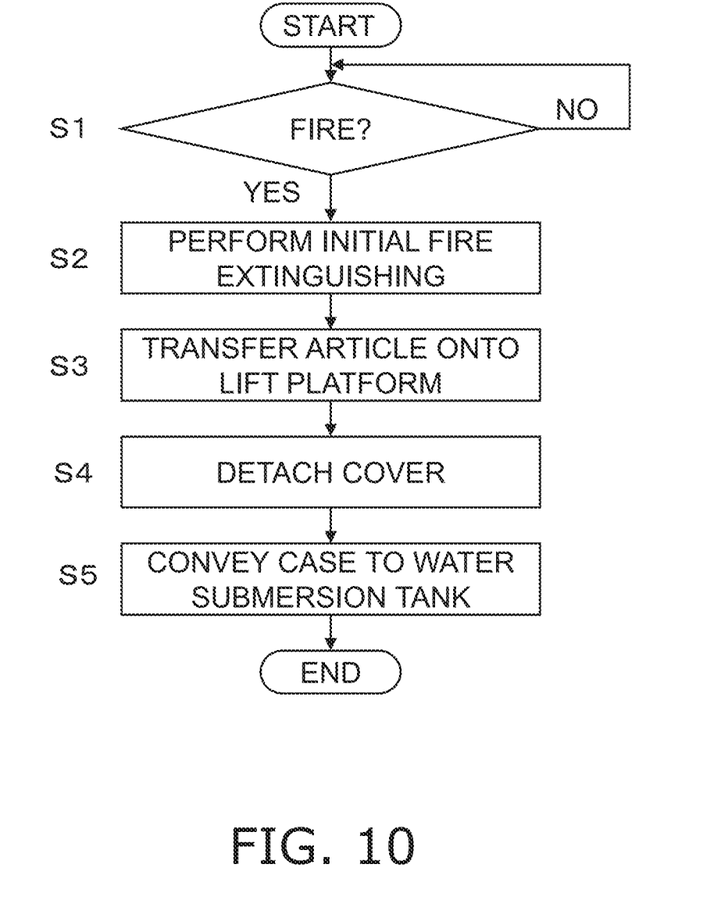
FIG. 10 is a flowchart illustrating a fire extinguishing control operation.

With reference to FIG. 10, the operation of the stacker crane 3 to extinguish fire in the case 7 is described. FIG. 10 is a flowchart illustrating a fire extinguishing control operation.

The control flowchart described below is merely an example, and some steps can be eliminated or exchanged. In addition, it may be possible that a plurality of steps are simultaneously performed, or that a portion or all of the steps are performed in an overlapping manner.

Further, each block of the control flowchart is not limited to a single control operation, but can be replaced with a plurality of control operations expressed in a plurality of blocks.

Note that operations of individual devices are results of instructions from the control unit to the devices, and are expressed by individual steps of a software application.

In Step S1, it is determined whether or not a fire has occurred in the rack 2. Specifically, a system controller 53 performs the determination based on a detection signal from the fire detector 9. At this time, it is also determined which one of the cases 7 on the shelves 6 has caused a fire.

In Step S2, the stacker crane 3 performs initial (primary) fire extinguishing work in the shelf 6. Specifically, when the system controller 53 receives a fire detection signal from the fire detector 9, it informs the crane controller 51 of the stacker crane 3 about the fire. Then, the stacker crane 3 moves the lift platform 14 to front of the shelf 6, and extinguishes the fire by ejecting carbon dioxide gas from the fire extinguishing nozzle 33 toward the case 7.

In Step S3, the slide fork 15 of the stacker crane 3 transfers the case 7 to inside of the lift platform 14. In this way, as illustrated in FIG. 6, the case 7 is placed on the top surface of the slide fork 15 (an example of the article placement surface). At this time, it is checked whether or not the slide fork 15 has moved to its original position, and whether or not the case 7 is placed on the slide fork 15, and the like. In addition, various sensors (such as the article protrusion sensor 55) are disabled.

In Step S4, the cover 43 is detached and allowed to fall. As a result, as illustrated in FIG. 11, the cover 43 covers the case 7. In this state, for example, the article protrusion sensor 55 is outside the cover 43, and is protected from a fire or high temperature in the case 7 after that.

In Step S5, the stacker crane 3 conveys the case 7 to the water submersion tank 10 and puts the case 7 with the cover 43 into the water submersion tank 10. Note that the cover 43 reduces or prevents spreading of the fire in the case 7 during conveying.

Note that the order of detaching the cover 43 (Step S4) and starting to convey the case 7 (Step S5) may be opposite.

Because the cover 43 is provided as described above, when conveying the case 7 after initial fire extinguishing to the water submersion tank 10, shattering of the case 7 or spreading of the fire can be prevented. In addition, the article protrusion sensor 55 on the lift platform 14 (an example of various sensors disposed to the lift platform 14) and the like can also be protected by the cover 43.

As the cover 43 is made of a flame retardant or non-inflammable material, fire spreading can be prevented even if a fire generate again at the case 7 on the lift platform 14.

It is sufficient that the cover 43 can be detached, and hence the cover 43 has a simple structure, and reliability is improved by reducing the number of drive components.

As the cover 43 is detached from the lock device 45, for example, when the case 7 is put into the water submersion tank 10 for example, the cover 43 can also be put in together. In other words, it is not necessary to perform an operation such as returning the cover 43 to its original position when putting the case 7 into the water submersion tank 10.

2. Second Preferred Embodiment

In the first preferred embodiment, the cover moves by its own weight after being detached, but the moving method is not particularly limited as long as the cover moves toward the article placement surface. The cover may be pushed by another member.

Figure 12:
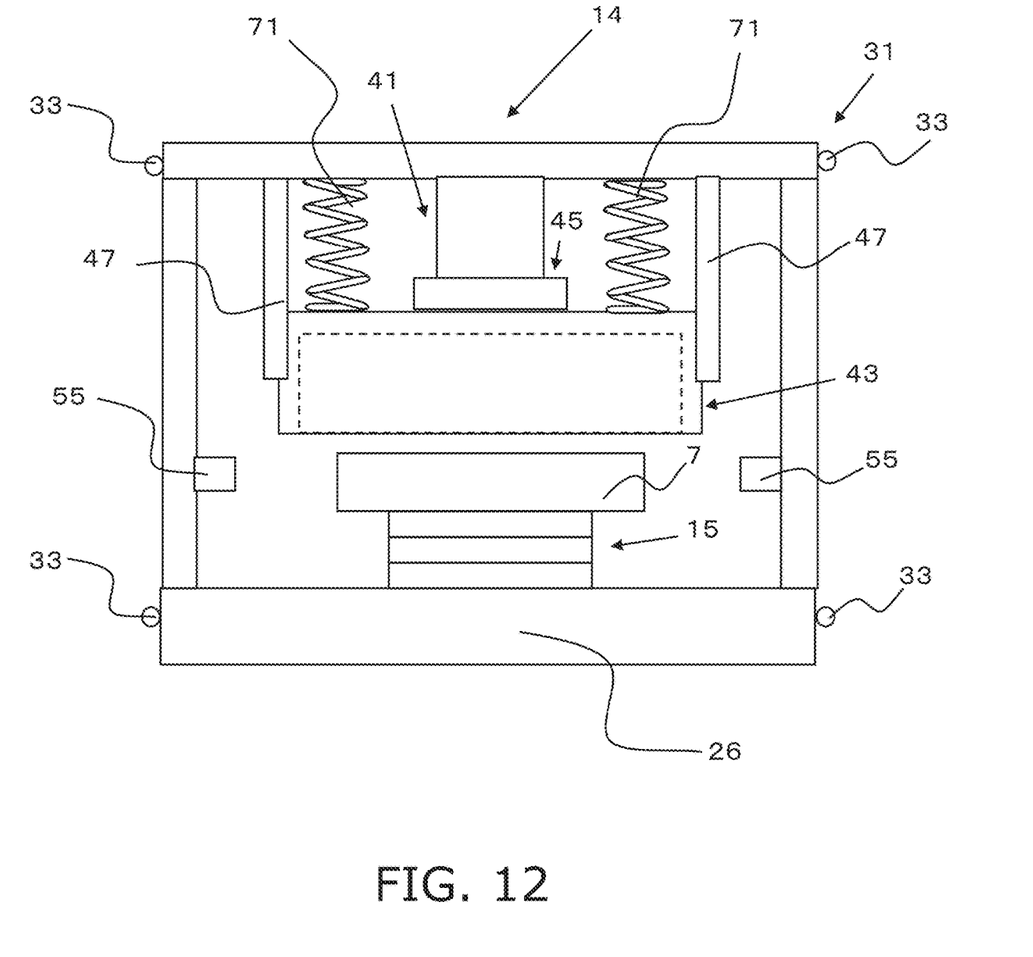
FIG. 12 is a schematic front view of the lift platform according to a second preferred embodiment (before detaching the cover).

With reference to FIG. 12, the above-mentioned example is described as a second preferred embodiment. FIG. 12 is a schematic front view of the lift platform (before detaching the cover) according to the second preferred embodiment. Note that the second preferred embodiment has the same basic structure and operation as those in the first preferred embodiment, and only different points are described.

As illustrated in FIG. 12, the lift platform 14 includes an elastic member 71 that pushes the cover 43 toward the top surface of the slide fork 15. The elastic member 71 may be a compression spring. Further, the elastic member 71 may be a coil spring, a leaf spring, or other spring. The elastic member 71 may be rubber or another elastic member.

When the cover is detached, the elastic member 71 presses the cover 43 downward, and the cover 43 can move quickly and securely.

3. Third Preferred Embodiment

In the first preferred embodiment, at least the inner surface of the cover is made of a non-inflammable or flame retardant material, but the inner surface may be coated with other material that contributes to fire extinguishing.

Figure 13:
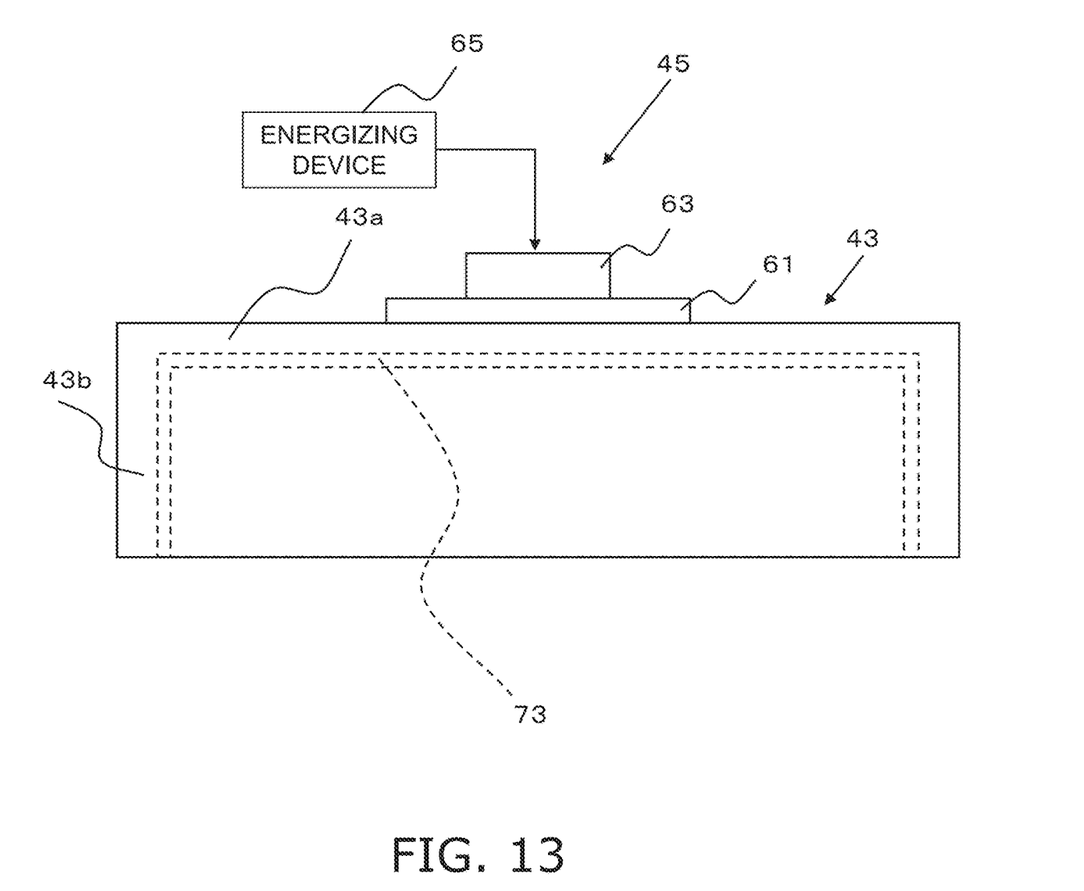
FIG. 13 is a schematic front view of the cover according to a third preferred embodiment of the present invention.

With reference to FIG. 13, the above-mentioned example is described as a third preferred embodiment. FIG. 13 is a schematic front view of the cover according to the third preferred embodiment.

As illustrated in FIG. 13, the inner surface of the cover 43 is coated with foam fire extinguisher 73 that foams at high temperature.

In this preferred embodiment, if a high temperature state maintains or restarts after the cover 43 covers the case 7, the foam fire extinguisher 73 foams and expands to fill the inside of the cover 43, so as to extinguish the fire.

Note that the foam fire extinguisher is, for example, chemical foaming agent, physical foaming agent, or foamable microcapsules.

The foam fire extinguisher 73 may be provided to either one of the top surface 43a and the side surface 43b of the cover.

The first to third preferred embodiments described above share the following structure and function.

The stacker crane (such as the stacker crane 3), which retrieves articles (such as the case 7) from a plurality of shelves (such as the shelf 6) and conveys the same, includes a traveling device, a mast, a lift platform, a transfer device, and a cover.

The mast (such as the mast 13) is provided to the traveling device (such as the traveling cart 12).

The lift platform (such as the lift platform 14) is movable up and down along the mast.

The transfer device (such as the slide fork 15) is operable to transfer the article onto the lift platform.

The cover (such as the cover 43) is made of a flame retardant or non-inflammable material, and is supported in a detachable manner so as to be movable toward an article placement surface of the lift platform (such as the top surface of the slide fork 15).

In this stacker crane, if a fire starts at the article on the shelf, after initial fire extinguishing, for example, the transfer device of the stacker crane places the article on the article placement surface of the lift platform. Next, the cover is detached and moved, so that the cover covers the article. After that, the stacker crane conveys the article to a water submersion tank (such as the water submersion tank 10), for example, and puts the article with the cover into the water submersion tank.

5. Other Preferred Embodiments

Although the preferred embodiments of the present invention are described above, the present invention is not limited to the preferred embodiments described above, but can be variously modified within the scope of the present invention without deviating from the spirit thereof. In particular, the plurality of preferred embodiments and variations described in this specification can be arbitrarily combined as necessary.

A specific structure of the lock device is not limited as long as the cover can be detached.

The lock device may include a mechanism in which the top surface of the cover is provided with a flange including a lower portion supported by a movable member. By moving the movable member laterally or diagonally downward, the cover can fall.

The lock device may include a mechanism in which the top surface of the cover is provided with a member with a hole, in which a pin is inserted for holding. By pulling out the pin, engagement between the pin and the member with a hole is released, so that the cover can fall.

The lock device may include a mechanism in which the top surface of the cover is provided with a ring, which is engaged with a hook for holding. By rotating the hook, engagement between the ring and the hook is released, so that the cover can fall.

A shape of the cover is not particularly limited as long as it can reduce or prevent fire spreading.

When the cover falls, it may not contact the article placement surface of the lift platform as long as it can be transferred together with the article. In other words, the cover may contact only the case.

It is sufficient that the cover has a shape capable of closing at least the opening of the container, and hence the size of the cover can be reduced or minimized. It is sufficient that the cover covers at least a portion of the opening of the case. As a result, the fire can hardly spread outside. In the first preferred embodiment, the cover covers the upper portion and the side portion of the case, but it may cover only the upper portion or may cover only the upper portion and a portion of the side portion.

The cover may seal the opening of the container or may be spaced apart from the opening.

The cover is not limited to a box shape. For instance, the cover may be a flat plate.

An article transfer device provided to the support table of the lift platform is not limited to the slide fork.

The transfer device may be a rear or front hook type. Specifically, an arm that can extend horizontally on both sides in the Y direction is provided with hooks, and the hook engages with the case so as to transfer the case between the lift platform and the shelf. In this case, if the cover has a shape to cover only the upper portion of the case, it does not interfere with the arm.

The article placement surface is a place on which the article is placed by the transfer device in the lift platform. The article placement surface is not limited to the top surface of the slide fork as long as the article can be moved with the lift platform. For instance, it may be a bottom surface provided to the lift platform.

The guide may support the four sides.

The guide may include rotating members such as rollers.

The guide may be eliminated.

The shelf that houses the secondary batteries may be a portion of a battery charging and discharging facility. There is a description that an electric device for charging and discharging a secondary battery is a processing device, and that a battery container housing a plurality of secondary batteries is an article, so that the article conveying device passes and receives the battery container to and from the electric device. In the charging and discharging facility, charging, aging, discharging, or other process is performed on the plurality of secondary battery 8 housed in the case 7.

For instance, a fire extinguishing device such as a sprinkler may be provided to the shelf itself.

The fire extinguishing device of the stacker crane may be eliminated.

The fire extinguishing device may be provided to the mast of the stacker crane.

The fire extinguishant may be a high-foaming fire extinguishant or a powder fire extinguishant.

If the fire extinguishing work with the fire extinguishing device and the cover can extinct the fire, the article may not be conveyed to the water submersion tank.

A structure of the water submersion tank is not particularly limited.

It may be possible to convey the article to other fire extinguishing equipment instead of the water submersion tank. The other fire extinguishing device is, for example, a fire extinguishing facility that ejects a fire extinguishant such as water to the article.

A structure or a shape of the case that houses batteries is not particularly limited.

The article may be other than the secondary batteries and the case.

In the first preferred embodiment, the series of fire extinguishing operations are performed automatically, but these operations may not be performed automatically. In other words, one or all of fire detection, initial fire extinguishing, detaching the cover, and secondary fire extinguishing may be performed based on operations of an operator.

Preferred embodiments of the present invention can be widely applied to stacker cranes having a fire prevention function.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stacker crane that retrieves articles from a plurality of shelves and conveys the same, the stacker crane comprising:
   a traveling device;
   a mast provided to the traveling device;
   a lift platform movable up and down along the mast;
   a transfer device to transfer the article onto the lift platform;

a cover made of a flame retardant or non-inflammable material, the cover being supported in a detachable manner so as to be movable toward an article placement surface of the lift platform;

a lock to hold the cover in a normal time and to detach the cover; and a controller configured or programmed to control the lock to detach the cover when the article is placed on the article placement surface after a fire generates at the article.

2. The stacker crane according to claim 1, wherein the cover is larger than the article and has a size sufficient to cover the article.

3. The stacker crane according to claim 1, wherein
the article is a container including an opening on its upper side; and
the cover has a shape to close at least the opening of the container.

4. The stacker crane according to claim 1, further comprising:
a sensor to detect that the article is placed on the article placement surface after the fire has started at the article.

5. The stacker crane according to claim 4, wherein the cover is movable toward the article placement surface by its own weight.

6. The stacker crane according to claim 4, further comprising an elastic pusher to push the cover toward the article placement surface.

7. The stacker crane according to claim 2, further comprising:
a sensor to detect that the article is placed on the article placement surface after the fire has started at the article.

8. The stacker crane according to claim 7, wherein the cover is movable toward the article placement surface by its own weight.

9. The stacker crane according to claim 7, further comprising an elastic pusher to push the cover toward the article placement surface.

10. The stacker crane according to claim 1, further comprising a guide to support the cover in a movable manner in the up and down direction.

11. The stacker crane according to claim 2, further comprising a guide to support the cover in a movable manner in the up and down direction.

12. The stacker crane according to claim 1, further comprising a foam fire extinguisher on an inner surface of the cover to foam at a predetermined temperature.

13. The stacker crane according to claim 2, further comprising a foam fire extinguisher on an inner surface of the cover to foam at a predetermined temperature.

* * * * *

UNITED STATES PATENT AND TRADEMARK OFFICE
CERTIFICATE OF CORRECTION

| | |
|---|---|
| PATENT NO. | : 12,338,111 B2 |
| APPLICATION NO. | : 18/009998 |
| DATED | : December 13, 2022 |
| INVENTOR(S) | : Junichi Fujiki |

Page 1 of 1

It is certified that error appears in the above-identified patent and that said Letters Patent is hereby corrected as shown below:

On the Title Page

Item (73), for the Assignee, change "MURATA MANUFACTURING, LTD., Kyoto (JP)" to --MURATA MACHINERY, LTD., Kyoto (JP)--

Signed and Sealed this
Twelfth Day of August, 2025

Coke Morgan Stewart
*Acting Director of the United States Patent and Trademark Office*